United States Patent
Ma et al.

(10) Patent No.: US 11,372,285 B2
(45) Date of Patent: Jun. 28, 2022

(54) BACKLIGHT COMPRISING A PLASTIC FRAME HAVING A PANEL RECEIVING PORTION THAT IS MADE OF A LIGHT REFLECTING MATERIAL INCLUDING A TRANSPARENT MATERIAL CONTAINING LIGHT SCATTERING PARTICLES, DISPLAY MODULE AND DISPLAY DEVICE

(71) Applicant: BOE TECHNOLOGY GROUP CO., LTD., Beijing (CN)

(72) Inventors: Yongda Ma, Beijing (CN); Yong Qiao, Beijing (CN); Xinyin Wu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 332 days.

(21) Appl. No.: 16/610,314

(22) PCT Filed: Apr. 15, 2019

(86) PCT No.: PCT/CN2019/082689
§ 371 (c)(1),
(2) Date: Nov. 1, 2019

(87) PCT Pub. No.: WO2019/201206
PCT Pub. Date: Oct. 24, 2019

(65) Prior Publication Data
US 2020/0081296 A1    Mar. 12, 2020

(30) Foreign Application Priority Data
Apr. 18, 2018  (CN) .......................... 201820550674.2

(51) Int. Cl.
*G02F 1/13357* (2006.01)
*G02F 1/1335* (2006.01)

(52) U.S. Cl.
CPC .. *G02F 1/133608* (2013.01); *G02F 1/133524* (2013.01); *G02F 1/133603* (2013.01)

(58) Field of Classification Search
CPC ....................... G02F 1/133524; G02F 1/13332
See application file for complete search history.

(56) References Cited

U.S. PATENT DOCUMENTS

| | | | | |
|---|---|---|---|---|
| 2012/0257417 A1* | 10/2012 | Lee | ......................... | G02B 6/005 362/622 |
| 2014/0085569 A1 | 3/2014 | Choi et al. | | |

(Continued)

FOREIGN PATENT DOCUMENTS

| CN | 201170823 Y | 12/2008 |
|---|---|---|
| CN | 201955487 U | 8/2011 |

(Continued)

OTHER PUBLICATIONS

Extended European Search Report dated Jan. 5, 2022 corresponding to application No. 19787784.8-1210.

*Primary Examiner* — Paul C Lee
(74) *Attorney, Agent, or Firm* — Nath, Goldberg & Meyer; Joshua B. Goldberg

(57) ABSTRACT

The present disclosure provides a backlight, a display module and a display device. The backlight includes a plastic frame and light guide plate, the plastic frame includes a panel receiving portion, the light guide plate is located below the panel receiving portion, an orthographic projection of the panel receiving portion in a direction perpendicular to a light emitting surface of the light guide plate is overlapped with an orthographic projection of an edge of the light guide plate in the same projection direction, and an angle between a side surface of the panel receiving portion (Continued)

close to a center of the light guide plate and a lower surface of the panel receiving portion adjacent to the light guide plate is less than 90 degrees.

12 Claims, 5 Drawing Sheets

(56) References Cited

U.S. PATENT DOCUMENTS

| | | |
|---|---|---|
| 2014/0139784 A1 | 5/2014 | Kawada |
| 2015/0002782 A1 | 1/2015 | Kim et al. |
| 2016/0054624 A1* | 2/2016 | Cho ................... G02B 6/0088 349/58 |
| 2016/0120045 A1* | 4/2016 | Park ................. G02F 1/133308 361/752 |
| 2020/0081296 A1 | 3/2020 | Ma et al. |

FOREIGN PATENT DOCUMENTS

| | | | |
|---|---|---|---|
| CN | 102402065 A | | 4/2012 |
| CN | 204287658 U | | 4/2015 |
| CN | 105842893 A | * 8/2016 | ........... G02F 1/1333 |
| CN | 107290898 A | * 10/2017 | ....... G02F 1/133608 |
| CN | 108303815 A | * 7/2018 | ....... G02F 1/133608 |
| CN | 207992649 U | | 10/2018 |

\* cited by examiner

BACKLIGHT COMPRISING A PLASTIC FRAME HAVING A PANEL RECEIVING PORTION THAT IS MADE OF A LIGHT REFLECTING MATERIAL INCLUDING A TRANSPARENT MATERIAL CONTAINING LIGHT SCATTERING PARTICLES, DISPLAY MODULE AND DISPLAY DEVICE

CROSS-REFERENCE TO RELATED APPLICATION

This application claims priority from Chinese application No. 201820550674.2 titled "BACKLIGHT, DISPLAY MODULE AND DISPLAY DEVICE" filed on Apr. 18, 2018, the disclosure of which is incorporated herein by reference in its entirety.

TECHNICAL FIELD

The present disclosure relates to the field of display technology, and particularly relates to a backlight, a display module and a display device.

BACKGROUND

In the related art, backlights, display modules and display devices typically include a plastic frame for receiving a liquid crystal panel and an optical film material. The plastic frame needs to be set with a certain width to keep certain strength, and edges of a visible area of the liquid crystal panel needs to be set within inner edges of the plastic frame, so as to prevent sudden changes in luminance at an edge area of the display device due to blockage of light emitted from a light guide plate by a panel receiving portion of the plastic frame. As a result, the liquid crystal module tends to have a too wide frame.

SUMMARY

The present disclosure provides a backlight, a display module and a display device. An inner edge side surface of a panel receiving portion for receiving a panel in a backlight plastic frame close to a display area is set to be an inclined surface through which light emitted from a light guide plate is reflected and then illuminated on edges of a visible area of a liquid crystal panel, thereby improving optical uniformity at edges of the visible area.

A backlight including a plastic frame and a light guide plate is provided, wherein the plastic frame includes a panel receiving portion, the light guide plate is located below the panel receiving portion; an orthographic projection of the panel receiving portion in a direction perpendicular to a light emitting surface of the light guide plate is overlapped with an orthographic projection of an edge of the light guide plate in the same projection direction, and an angle between a side surface of the panel receiving portion close to a center of the light guide plate and a lower surface of the panel receiving portion adjacent to the light guide plate is less than 90 degrees.

The angle between the side surface of the panel receiving portion close to the center of the light guide plate and the lower surface of the panel receiving portion close to the light guide plate is between 15 to 75 degrees.

The backlight further includes a back plate and a light source, the light source is provided on an inner side surface of the back plate, the light guide plate is provided on an upper surface of the back plate close to the light source, a gap is provided between the light source and the light guide plate, the panel receiving portion of the plastic frame is provided on a side of the light guide plate away from the back plate, the light source includes at least one point light source between which a gap is present, and a recess is disposed in the panel receiving portion at a position corresponding to each gap between the point light sources.

The panel receiving portion is made of a light reflecting material.

The panel receiving portion is made of a transparent material containing light scattering particles.

A spot-like light extraction structure including a plurality of light emitting holes is provided on the light guide plate.

A projection of at least one light emitting hole of the spot-like light extraction structure in the direction of the light emitting surface of the light guide plate is overlapped with a projection of the recess in the panel receiving portion in the direction of the light emitting surface of the light guide plate.

The plastic frame, the back plate, the light source, and the light guide plate are arranged sequentially along an extending direction of the panel receiving portion toward the center of the light guide plate, and the projection of at least one light emitting hole of the spot-like light extraction structure in the direction of the light emitting surface of the light guide plate is overlapped with a projection of an edge of the recess in the panel receiving portion close to an outer edge side of the plastic frame in the direction of the light emitting surface of the light guide plate.

In some implementations, the present disclosure provides a display device including any one of the backlights as described above.

In some implementations, a display module including a backlight and a liquid crystal panel is provided, the backlight including a plastic frame and a light guide plate, wherein the plastic frame includes a panel receiving portion, a projection of the panel receiving portion in a thickness direction of the module is overlapped with an edge of the light guide plate, an angle between a side surface of the panel receiving portion close to a display area of the liquid crystal panel and a lower surface of the panel receiving portion adjacent to the light guide plate is less than 90 degrees, and a projection of a side surface of the panel receiving portion close to a center of the display area of the liquid crystal panel on the liquid crystal panel is at least partially overlapped with a visible area of the liquid crystal panel.

The angle between the side surface of the panel receiving portion close to the display area of the liquid crystal panel and the lower surface of the panel receiving portion adjacent to the light guide plate is between 15 to 75 degrees.

The backlight further includes a back plate and a light source, the light source is provided on an inner side surface of the back plate, the light guide plate is provided on an upper surface of the back plate close to the light source, a gap is provided between the light source and the light guide plate, the panel receiving portion of the plastic frame is provided on a side of the light guide plate away from the back plate, the light source includes at least one point light source between which a gap is present, and a recess is disposed in the panel receiving portion at a position corresponding to each gap between the point light sources.

The panel receiving portion is made of a light reflecting material.

The panel receiving portion is made of a transparent material containing light scattering particles.

A spot-like light extraction structure including a plurality of light emitting holes is provided on the light guide plate.

A projection of at least one light emitting hole of the spot-like light extraction structure in the direction of a light emitting surface of the display module is overlapped with a projection of the recess in the panel receiving portion in the direction of the light emitting surface of the display module.

A display area boundary of the liquid crystal panel at least partially falls within an orthographic projection of the panel receiving portion on the liquid crystal panel.

The backlight further includes an optical film provided between the panel receiving portion and the light guide plate.

The optical film is provided between the panel receiving portion and the liquid crystal panel.

In some implementations, the present disclosure provides a display device including any one of the display modules as described above.

BRIEF DESCRIPTION OF THE DRAWINGS

The drawings described herein are intended to provide a further understanding of the present disclosure, and are intended to be a part of the present disclosure. The exemplary embodiments of the present disclosure and the description thereof are for explaining the present disclosure and do not constitute any limitation to the present disclosure. In the drawings.

DETAILED DESCRIPTION OF THE EMBODIMENTS

To make the embodiments, technical solutions and advantages of the disclosure clearer, the technical solutions in the embodiments of the disclosure will now be described clearly and completely with reference to the accompanying drawings of the embodiments of the disclosure. Obviously, the described embodiments are only a part, not all, of the embodiments of the disclosure. All other embodiments obtained by the ordinarily skilled in the art based on the embodiments of the present disclosure without paying any creative effort shall be included in the protection scope of the present disclosure.

In the related art, backlights, display modules and display devices typically include a plastic frame for receiving a liquid crystal panel and an optical film material. The plastic frame needs to be set with a certain width to keep certain strength, and edges of a visible area of a liquid crystal panel needs to be set within inner edges of the plastic frame, so as to prevent sudden changes in luminance at an edge area of the display device due to blockage of light emitted from a light guide plate by a panel receiving portion of the plastic frame. As a result, the liquid crystal module tends to have a too wide frame.

By setting a side surface of the panel receiving portion for receiving a panel in the backlight plastic frame close to the center of the display area to an inclined surface, the backlight, display module and display device provided in the present disclosure increase an area in which light from the backlight illuminates a lower surface of the liquid crystal panel of the liquid crystal module and thus shorten a distance from an edge of the visible area of the display module to an edge of the display module. Meanwhile, by means of position matching of the concave-convex structure on the panel receiving portion of the plastic frame with the spot-like light extraction structure on the light guide plate, the present disclosure provides a powerful guarantee for adjusting the optical effect at an edge of the display device, which not only satisfies the mechanical strength requirements of the panel receiving portion of the plastic frame by a narrow-frame display module, but also ensures the requirements for adjusting the optical effect at the edge of the display device. The technical solution of the present disclosure will be described in detail below with reference to specific embodiments.

Figure 1:
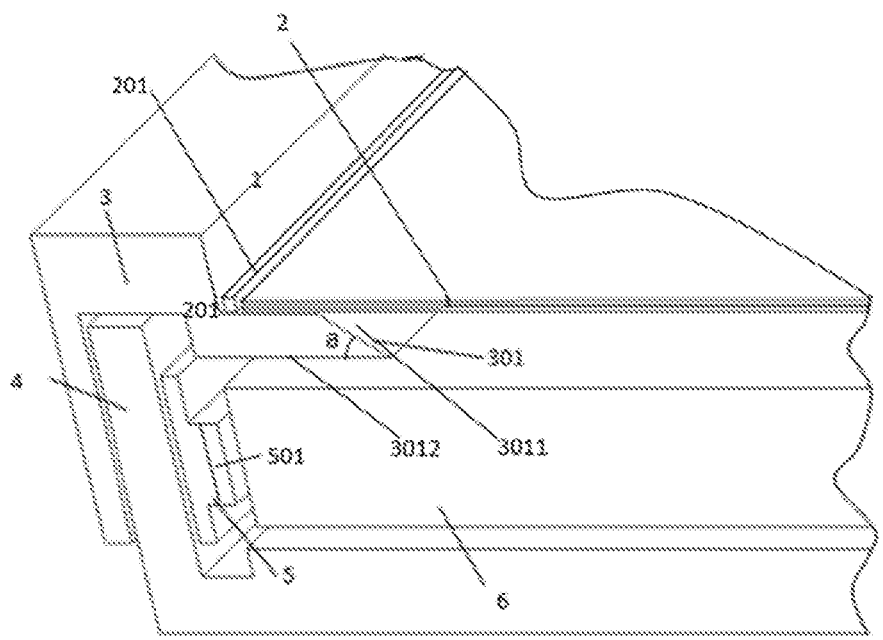
FIG. 1 is a schematic cross-sectional diagram of a backlight according to a first embodiment of the disclosure.
Figure 2:
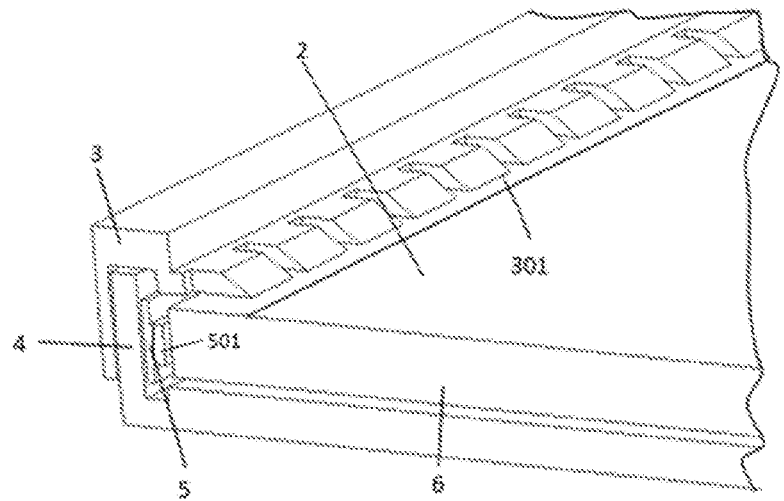
FIG. 2 is a schematic diagram of a backlight structure with an optical film and a liquid crystal panel spacer removed according to a first embodiment of the disclosure.
Figure 3:
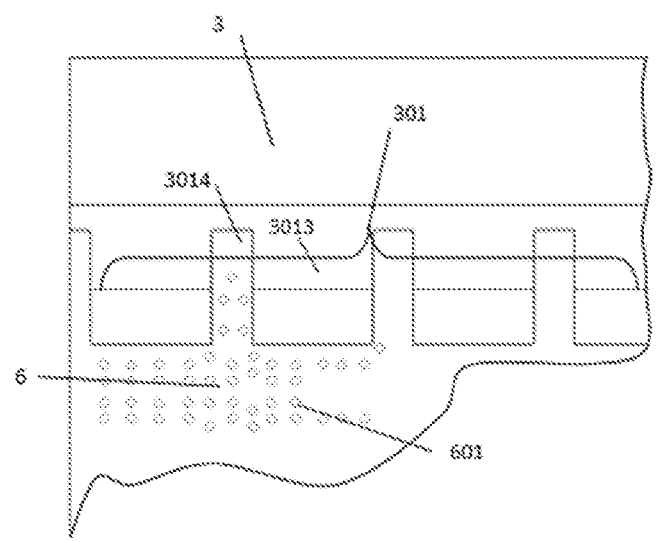
FIG. 3 is a schematic structural diagram of a backlight including a spot-like light extraction structure on a light guide plate and a panel receiving portion according to a first embodiment of the disclosure.

FIG. 1 is a schematic cross-sectional diagram of a backlight according to a first embodiment of the disclosure; FIG. 2 is a schematic diagram of a backlight structure with an optical film and a liquid crystal panel cushion removed according to a first embodiment of the disclosure; and FIG. 3 is a schematic structural diagram of a backlight including a spot-like light extraction structure on a light guide plate and a panel receiving portion according to a first embodiment of the disclosure. As shown in FIGS. 1, 2, and 3, the backlight of this embodiment includes a back plate 4, a light source 5, a light guide plate 6, an optical film 2, a liquid crystal panel cushion 201, and a plastic frame 3, wherein the cushion is used for supporting the liquid crystal panel, and the plastic frame includes a panel receiving portion 301 for receiving the liquid crystal panel and on which the optical film 2 is provided. The back plate 4 and the plastic frame 3 both have an L-shaped structure. The light source 5 is provided on an inner side surface of the back plate 4 and provided with point light source lamps 501. A light emitting surface of the point light source lamps 501 faces a light incident surface of the light guide plate 6. A gap is provided between the light emitting surface of the point light source lamps 501 and the light incident surface of the light guide plate 6. An angle α, greater than 0 degree and less than 90 degrees, is present between a side surface 3011 of the panel receiving portion 301 close to a center of a display area of the liquid crystal panel and a bottom surface 3012 of the panel receiving portion close to the light guide plate 6, so that part of the light emitted from the light guide plate 6 directly reaches an area of overlapped projections of the optical film 2 and an inclined surface of the panel receiving portion on a lower surface of the optical film, thereby increasing the effective light emitting area of the backlight. Moreover, by inclining the side surface of the panel receiving portion close to the display area, the light emitted from the backlight is projected onto a lower substrate of the liquid crystal panel opposite to the backlight with an increased area, thereby achieving more uniform luminance at an edge position of the visible area of the display module.

In this embodiment, as shown in FIG. 1, the angle between the inner side surface 3011 of the panel receiving portion and the bottom surface 3012 is 15° to 75°.

An angle in this range can ensure a balanced effect between the mechanical strength of the panel receiving portion and the uniform optical effect of the display module.

In this embodiment, as shown in FIGS. 2 and 3, the liquid crystal panel receiving portion 301 on the backlight plastic frame 3 has a configuration in which recesses 3014 and protrusions 3013 are arranged alternatively. The recess portion allows more light from the backlight to be illuminated onto a surface of a lower substrate of the liquid crystal panel close to the backlight, thereby providing more adjusting space for the optical balance at a periphery of the display module.

In this embodiment, as shown in FIGS. 2 and 3, the light source is a point light source light bar, the protrusions 3013 on the panel receiving portion 301 correspond to the point light source lamps 501, and the recesses 3014 in the panel receiving portion 301 correspond to gaps between the point light source lamps 501. An area right above the point light source lamp has a higher luminance, while an area between the point light source lamps has a lower luminance. Therefore, the recess provided corresponding to the position between the lamps can allow more light to reach the bottom of the liquid crystal panel. In this embodiment, as shown in FIG. 3, the light extraction structures 601 on the light guide plate 6 are light emitting holes distributed as spots, and the light emitting holes distributed as spots are located on a surface of the light guide plate 6 close to the back plate 4. The spot-like light extraction structure is more beneficial to adjusting local light emission intensity.

In this embodiment, as shown in FIG. 3, a projection of at least one light emitting hole of the spot-like light extraction structures 601 on the light guide plate 6 in the direction of a light emitting surface of the liquid crystal module is overlapped with a projection of the recess in the panel receiving portion in the direction of the light emitting surface of the liquid crystal module. The recesses 3014 are each provided with a spot-like light extraction structure, which is beneficial to adjusting the light emission intensity in the area of the recesses 3014.

In this embodiment, the projection of at least one light emitting hole of the spot-like light extraction structures provided on the light guide plate 6 in the light emitting surface direction of the liquid crystal module is overlapped with the projection of an edge of the recesses 3014 in the panel receiving portion 301 close to an outer edge side surface of the plastic frame in the light emitting surface direction of the liquid crystal module. A distribution boundary of the spot-like light extraction structures 601 is beyond an outer boundary of the recesses 3014 in the panel receiving portion, and the light emission intensity is adjusted by the distribution of the point-like light extraction structures within an outline of the recesses 3014.

Figure 4:
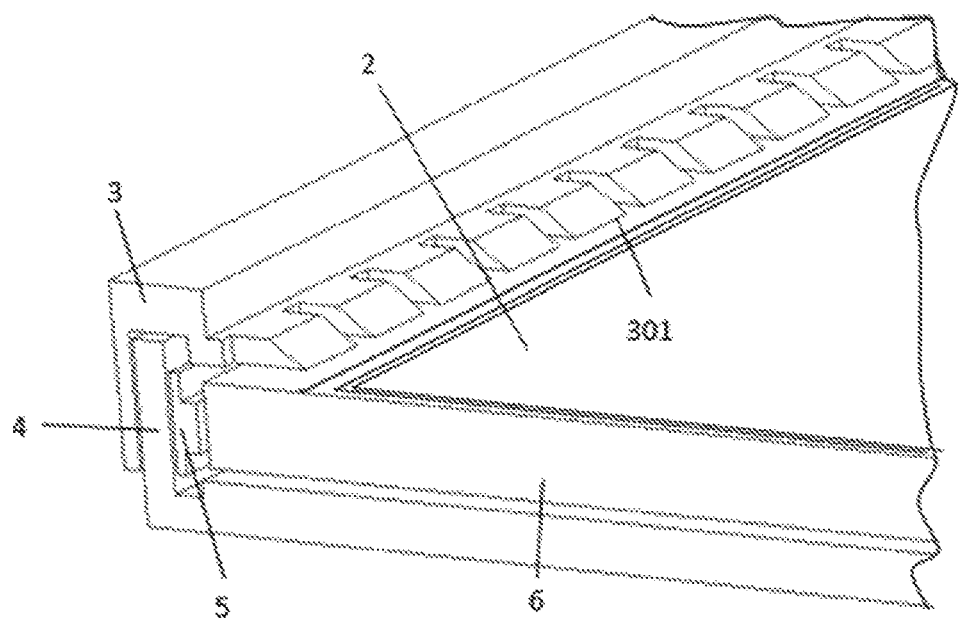
FIG. 4 is a schematic cross-sectional diagram of a backlight according to a second embodiment of the disclosure.

FIG. 4 is a schematic cross-sectional diagram a backlight according to a second embodiment of the disclosure. Unlike the embodiment shown in FIGS. 1 to 3, the optical film material 2 of the backlight in this embodiment is provided on an upper surface of the light emitting surface of the light guide plate 6. The optical film does not contact a surface of the panel receiving portion 301 facing the liquid crystal panel. The optical film is provided below the panel receiving portion to provide a more sufficient mixing distance for light.

Figure 7:
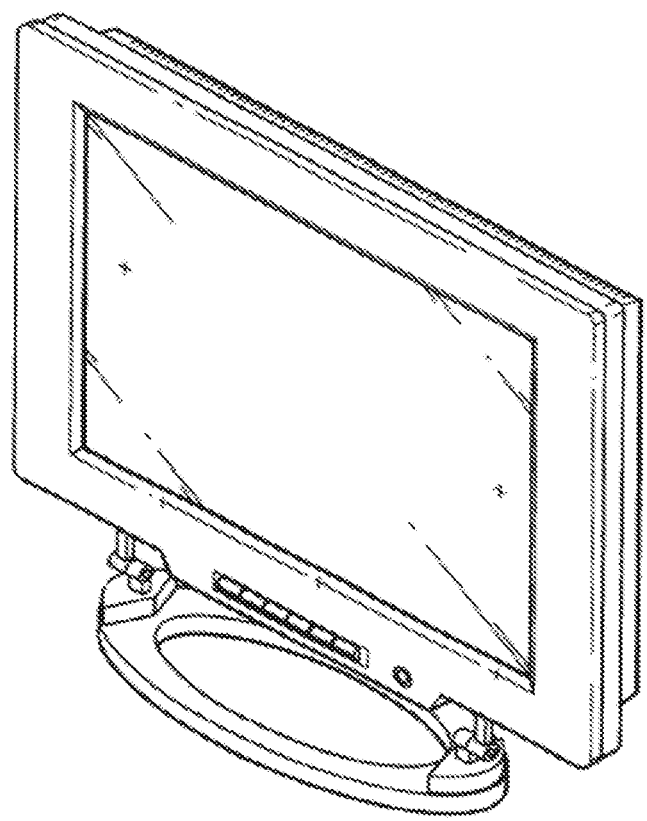
FIG. 7 is a schematic diagram of a display device according to the present disclosure.

FIG. 7 is a schematic diagram of a display device according to the present disclosure. As shown in FIG. 7, a display device is provided, wherein the display device includes the backlight as described above. The display device including the backlight can effectively improve the optical display effect at the edge of the visible area.

Figure 5:
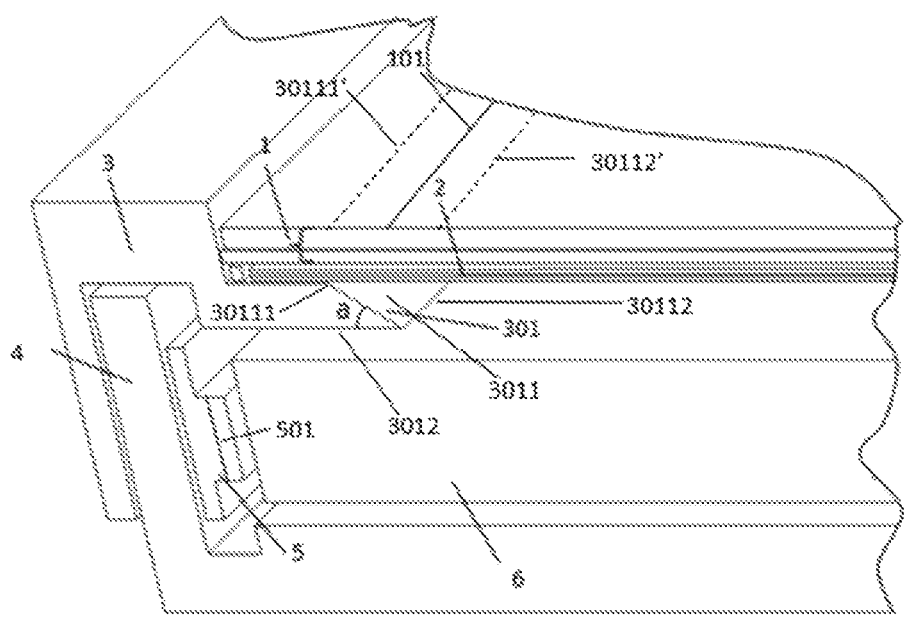
FIG. 5 is a schematic cross-sectional diagram of a display module according to an embodiment of the disclosure.

FIG. 5 is a schematic cross-sectional diagram of a display module according to an embodiment of the disclosure. The display module in this embodiment includes: a liquid crystal panel 1, an optical film 2, and a plastic frame 3 including a panel receiving portion 301 for receiving the liquid crystal panel 1 and on which the optical film 2 is provided. A light source 5 is provided on a side surface edge of a back plate 4 and provided with point light source lamps 501. A light emitting surface of the point light source lamps 501 faces a light incident surface of the light guide plate 6. A gap is provided between the light emitting surface of the point light source lamps 501 and the light incident surface of the light guide plate 6. An angle α, greater than 0 degree and less than 90 degrees, is present between a side surface 3011 of the panel receiving portion 301 close to a center of the display area of the liquid crystal panel and a bottom surface 3012 of the panel receiving portion close to the light guide plate 6, so that part of the light emitted from the light guide plate 6 directly reaches an area of overlapped projections of the optical film 2 and an inclined surface of the panel receiving portion on a lower surface of the optical film, thereby increasing the effective light emitting area of the backlight. The projection of an edge 30112 of the panel receiving portion side surface 3011 close to the center of the display module on the liquid crystal panel 1 is 30112', and the projection of an edge 30111 of the panel receiving portion side surface 3011 away from the center of the display module on the liquid crystal panel 1 is 30111'. A visible area boundary 101 of the liquid crystal panel 1 falls at least partially between 30111' and 30112'.

The visible area of the liquid crystal panel 1 is overlapped with the projection of the side surface 3011 of the panel receiving portion 301 close to the center of the display area on the plane of the liquid crystal panel so that the edge of the display module can be set narrower. Moreover, by inclining the side surface of the panel receiving portion close to the display area, the light emitted from the backlight is projected onto a lower substrate of the liquid crystal panel opposite to the backlight with an increased area, thereby achieving more uniform luminance at an edge position of the visible area of the display module.

In this embodiment, the angle between the side surface 3011 of the panel receiving portion 301 close to the display area and the lower surface of the panel receiving portion is between 15 to 75 degrees. An angle in this range can ensure a balanced effect between the mechanical strength of the panel receiving portion and the uniform optical effect of the display module.

In this embodiment, in the same structures as shown in FIGS. 2 and 3, the panel receiving portion is provided to have a shape of alternative protrusions 3013 and recesses 3014. In the panel receiving portion 301 having a shape of alternative protrusions 3013 and recesses 3014, the recess portion allows more light from the backlight to be illuminated onto a surface of the lower substrate of the liquid crystal panel 1 close to the backlight, thereby providing more sufficient adjusting space for the optical illuminance at a periphery of the display module.

In this embodiment, in the same structures as shown in FIGS. 2 and 3, the light source 5 is a point light source light bar, the protrusions 3013 correspond to the point light source lamps 501, and the recesses 3014 correspond to gaps between the point light source lamps. An area right above the point light source lamp has a higher luminance, while an area corresponding to the gap between the point light source lamps has a lower luminance. Therefore, the recess 3014 provided corresponding to the position between the lamps can allow more light to reach the bottom of the liquid crystal panel.

In this embodiment, in the same structure as that shown in FIG. 3, the light extraction structures on the light guide plate are light emitting holes distributed as spots. The spot-like light extraction structure is more beneficial to adjusting local light emission intensity by adjusting the number and density of the spot-like light emitting structures.

In this embodiment, in the same structure as that shown in FIG. 3, at least one light emitting hole in the projection of the spot-like light extraction structures in the direction of the light emitting surface of the liquid crystal module is overlapped with the projection of the recesses 3014 in the panel receiving portion in the direction of the light emitting surface of the liquid crystal module. The recesses 3014 are each provided with a spot-like light extraction structure, which is beneficial to adjusting the light emission intensity in the area of the recesses 3014.

In this embodiment, in the same structure as that shown in FIG. 3, at least one light emitting hole in the projection of the spot-like light extraction structures in the direction of the light emitting surface of the liquid crystal module is overlapped with the projection of an edge of the recesses 3014 in the panel receiving portion close to an outer edge of the plastic frame in the direction of the light emitting surface of the liquid crystal module. A distribution boundary of the spot-like light extraction structures is beyond an outer boundary of the recesses 3014 in the panel receiving portion, and the light emission intensity is adjusted by the distribution of the point-like light extraction structures within an outline of the recesses 3014.

Figure 6:
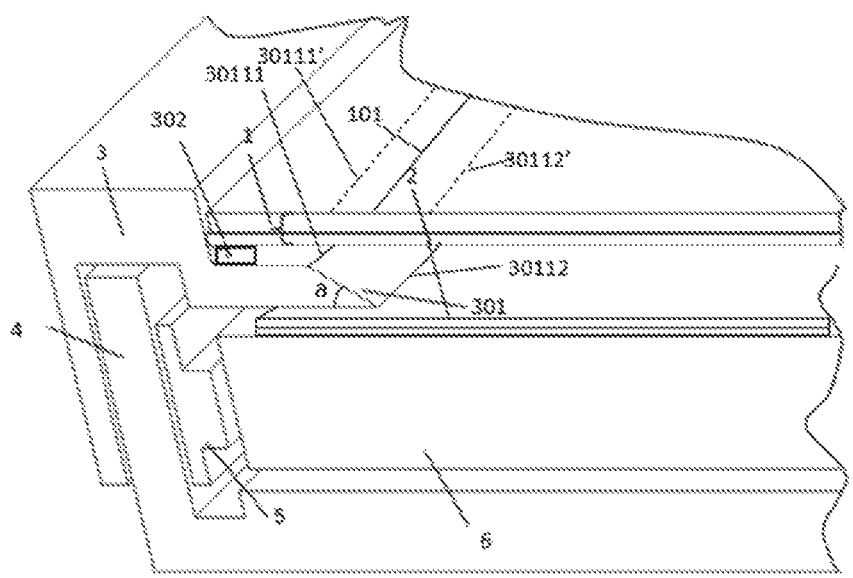
FIG. 6 is a schematic cross-sectional diagram of a display module according to another embodiment of the disclosure.

FIG. 6 is a schematic cross-sectional diagram of a display module according to another embodiment of the disclosure. The display module shown in FIG. 6 is different from that of FIG. 5 in that the optical film 2 of the display module in FIG. 6 is provided below the panel receiving portion 301. A panel spacer is provided between the liquid crystal panel 1 and the panel receiving portion 301. The optical film is provided below the panel receiving portion to provide a more sufficient mixing distance for light.

FIG. 7 is a schematic diagram of a display device according to the present disclosure. As shown in FIG. 7, a display device is provided, wherein the display device includes any one of the display modules as described above. The display device has a greater function of adjusting edge light effect, thereby avoiding sudden changes in luminance at edges of the display device, and improving optical uniformity at edges of the visible area. Finally, it should be noted that the above embodiments are only used to illustrate the technical solutions of the present disclosure, and not to limit it; although the present disclosure has been described in detail with reference to the foregoing embodiments, it is to be understood by those skilled in the art that various changes may still be made in the above embodiments, or equivalents may be substituted for some of the features described in the foregoing embodiments; and such changes or substitutions do not make the corresponding technical solutions depart from the spirit and scope of the embodiments of the present disclosure.

What is claimed is:

1. A backlight comprising a plastic frame and a light guide plate, wherein the plastic frame comprises a panel receiving portion, the light guide plate is located below the panel receiving portion, an orthographic projection of the panel receiving portion in a direction perpendicular to a light emitting surface of the light guide plate is overlapped with an orthographic projection of an edge of the light guide plate in the same projection direction, and an angle between a side surface of the panel receiving portion close to a center of the light guide plate and a lower surface of the panel receiving portion adjacent to the light guide plate is less than 90 degrees, the backlight further comprising a back plate and a light source, wherein the light source is provided on an inner side surface of the back plate, the light guide plate is provided on an upper surface of the back plate close to the light source, a gap is provided between the light source and the light guide plate, the panel receiving portion of the plastic frame is provided on a side of the light guide plate away from the back plate, the light source comprises a plurality of point light sources between which a gap is present, and a recess is disposed in the panel receiving portion at a position corresponding to each gap between the point light sources, wherein the panel receiving portion is made of a light reflecting material, wherein the panel receiving portion is made of a transparent material containing light scattering particles, and wherein a spot-like light extraction structure comprising a plurality of light emitting holes is provided on the light guide plate.

2. The backlight according to claim 1, wherein the angle between the side surface of the panel receiving portion close to the center of the light guide plate and the lower surface of the panel receiving portion close to the light guide plate is between 15 to 75 degrees.

3. The backlight according to claim 1, wherein a projection of at least one light emitting hole of the spot-like light extraction structure in the direction of the light emitting surface of the light guide plate is overlapped with a projection of the recess in the panel receiving portion in the direction of the light emitting surface of the light guide plate.

4. The backlight according to claim 3, wherein the plastic frame, the back plate, the light source, and the light guide plate are arranged sequentially along an extending direction of the panel receiving portion toward the center of the light guide plate, and the projection of at least one light emitting hole of the spot-like light extraction structure in the direction of the light emitting surface of the light guide plate is overlapped with a projection of an edge of the recess in the panel receiving portion close to an outer edge side of the plastic frame in the direction of the light emitting surface of the light guide plate.

5. A display device, characterized in comprising the backlight according to claim 1.

6. A display module comprising a backlight and a liquid crystal panel, the backlight comprising a plastic frame and a light guide plate, wherein the plastic frame comprises a panel receiving portion, a projection of the panel receiving portion in a thickness direction of the module is overlapped with an edge of the light guide plate, an angle between a side surface of the panel receiving portion close to a display area of the liquid crystal panel and a lower surface of the panel receiving portion adjacent to the light guide plate is less than 90 degrees, and a projection of a side surface of the panel receiving portion close to a center of the display area of the liquid crystal panel on the liquid crystal panel is at least partially overlapped with a visible area of the liquid crystal panel, the backlight further comprising a back plate and a light source, wherein the light source is provided on an inner side surface of the back plate, the light guide plate is provided on an upper surface of the back plate close to the light source, a gap is provided between the light source and the light guide plate, the panel receiving portion of the plastic frame is provided on a side of the light guide plate away from the back plate, the light source comprises at least one point light source between which a gap is present, and a recess is disposed in the panel receiving portion at a position corresponding to each gap between the point light source, wherein the panel receiving portion is made of a light reflecting material, wherein the panel receiving portion is made of a transparent material containing light scattering particles, and wherein a spot-like light extraction structure comprising a plurality of light emitting holes is provided on the light guide plate.

7. The display module according to claim 6, wherein the angle between the side surface of the panel receiving portion close to the display area of the liquid crystal panel and the lower surface of the panel receiving portion adjacent to the light guide plate is between 15 to 75 degrees.

8. The display module according to claim 6, wherein a projection of at least one light emitting hole of the spot-like light extraction structure in the direction of a light emitting surface of the display module is overlapped with a projection of the recess in the panel receiving portion in the direction of the light emitting surface of the display module.

9. The display module according to claim 6, wherein a display area boundary of the liquid crystal panel at least partially falls within an orthographic projection of the panel receiving portion on the liquid crystal panel.

10. The display module according to claim 9, wherein the backlight further comprises an optical film provided between the panel receiving portion and the light guide plate.

11. The display module according to claim 9, wherein the optical film is provided between the panel receiving portion and the liquid crystal panel.

12. A display device comprising the display module according to claim 6.

* * * * *